United States Patent [19]

Lund

[11] Patent Number: 4,973,368
[45] Date of Patent: Nov. 27, 1990

[54] METHOD OF MANUFACTURING STEEL ELEMENTS DESIGNED TO WITHSTAND HIGH STRESS, SUCH AS ROLLER BEARING ELEMENTS

[75] Inventor: Thore Lund, Hofors, Sweden
[73] Assignee: Ovako Steel AB, Sweden
[21] Appl. No.: 383,319
[22] Filed: Jul. 20, 1989

[30] Foreign Application Priority Data

Sep. 2, 1988 [SE] Sweden ............................ 8803073

[51] Int. Cl.⁵ ...................... C21D 8/00; C21D 9/36
[52] U.S. Cl. ............................ 148/12.4; 148/12 R; 148/12 B; 148/12 F; 148/906
[58] Field of Search ............... 148/906, 12 R, 12 B, 148/12 F, 12.4

[56] References Cited

U.S. PATENT DOCUMENTS 2,097,878  1/1935  Grabe ................................ 148/906
3,369,942  2/1968  Bamberger ........................ 148/906
3,859,146  1/1975  Habrover et al. ................. 148/906

FOREIGN PATENT DOCUMENTS 7315058  5/1975  Sweden .

Primary Examiner—Deborah Yee
Attorney, Agent, or Firm—Ostrolenk, Faber, Gerb & Soffen

[57] ABSTRACT

Steel elements designed to withstand high stress, such as roller bearing elements, are produced by using a steel which has substantially eutectoid composition, a such a steel billet being plasticly formed, without prior soft-annealing, at a temperature just above the A1 temperature of the steel, to a shape approaching the final shape of the element, the element thus shaped being thereafter hardened directly from the forming temperature and being subsequently subjected in conventional manner to final grinding and polishing if required.

2 Claims, No Drawings

METHOD OF MANUFACTURING STEEL ELEMENTS DESIGNED TO WITHSTAND HIGH STRESS, SUCH AS ROLLER BEARING ELEMENTS

The present invention relates to a method of manufacturing steel elements designed to withstand high stress, such as roller bearing elements, e.g. rolling bearing rings.

The conventional method of producing rings for race ball-bearings of medium dimensions is as follows:

A steel is used containing approximately 1% C, 0.25% Si, 0.30% Mn and 1.5% Cr, or modifications of this analysis. This steel is supplied as a starting billet in the form of pipes, wire or rolled rings. Before being delivered, the billet must be subjected to soft-annealing to permit or facilitate actual shaping of the element itself, which is normally performed by turning. Turning may also be replaced by cold forming or semi-hot forming. The elements thus formed are then subjected to a heat treatment which may consist of the element thus formed being austenitized at a temperature of about 850° C. and then quenched in oil or some other quick-coolant. The formed element is then usually tempered to reduce internal stresses and increase permanence of dimensions.

The ring is ground or polished in a final operation.

If the steel billet is delivered in the form of a bar it need not, of course, be in soft-annealed state. In this case soft-annealing is performed after forging in order to permit machining by turning or plastic deformation.

An object of the invention is to offer a method permitting a reduction in the stages needed to produce the product in question, thus reducing production costs.

According to the invention, this object is achieved by following the directions defined in the appended claim 1.

Embodiments of the invention are defined in the sub-claim.

The object of the invention is thus basically achieved by
 (a) using a steel which has substantially eutectoid composition,
 (b) forming the element at a temperature just above the A1 temperature of the steel to a shape approaching its final shape, and
 (c) hardening the element directly from the forming temperature.

The invention thus teaches the feature or the technical effect that the steel billets which are to be formed to a shape approaching the final shape of the element need not be subjected to any soft-annealing.

Through the proposed eutectoid steel composition, the advantage is gained that the forming temperature may be that stated, i.e. considerably lower than the forming temperature required in the known method described above. This results in lower tool wear, thanks both to lower thermal load and also a considerable reduction in oxide scale and the decarburization appearing in conjunction therewith (particularly at moderate forming rates).

The material used for manufacturing bearings shall consist of a high-grade steel which corresponds, from a metallurgical point of view, to the demands placed on steel for high-strain applications.

The steel analysis shall be selected so that the steel has a eutectoid or almost eutectoid composition.

For a pure carbon steel this means that the carbon content shall be very close to 0.8%C. For alloyed steel the carbon content must be adjusted to the type and content of the alloys used so that the composition is eutectoid.

The alloy content selected shall be suited to the demands for temperability in the product, which are usually determined by the material thickness of the product.

Semi-manufactures (pipes, wire, rolled rings or bars) need not be subjected to any form of soft-annealing heat treatment before being delivered.

The proposed forming consists of a semi-hot plastic working, the working being performed so that the product is given a shape sufficiently close to its final shape for turning to be avoided.

The forming is performed at a temperature just above the A1 temperature of the material.

The reason for the eutectoid or substantially eutectoid composition is that such a composition gives the lowest temperature for conversion to austenite in such a quantity that sufficient hardness can be obtained after quenching.

For a moderately alloyed steel with about 0.8% C, heating to about 750–800° C. is sufficient for subsequent quenching to give satisfactory hardness and core structure.

The equivalent temperature for ball-bearing steels normally used is about 840–870° C.

The semi-hot forming can be performed extremely efficiently at this temperature.

If equivalent forming is performed at temperature greatly in excess of 800° C., tool wear will be a considerable problem partly due to the increased heat load, but primarily due to the rapidly increasing formation of oxide scale. Decarburization also starts to appear at these temperatures, particularly when the forming rate is moderate.

Briefly, the claimed method offers the following important advantages over the conventional methods described:

The time-consuming, expensive and complicated soft-annealing used today can be avoided.
 The problems which may occur here, such as decarburization and structural deviations which disturb soft-annealing and forming are avoided.
 Turning, which is a complex, expensive operation which destroys material, is avoided.
 Cold-forming places considerable demands on compression forces and tool, but produces a product with narrow tolerances and excellent properties. Heat treatment is, however, required after cold-forming in order to achieve acceptable product properties. This means that the great advantages of cold-forming are immediately lost since the heat treatment gives dimensional changes and produces surfaces that require grinding.
 Semi-hot forming as performed nowadays takes place in the temperature area in the initial stages of conversion, so that the advantages of cold-forming can be emulated, but with reduced demands on compression force and tool wear. Even with the semi-hot forming often performed for applications of the type in question, a separate heat treatment is necessary.
 The proposed method integrates the manufacture of the bearing rings in the example to a single production step from raw material to a pre-component ready for grinding.

EXAMPLE

The manufacture of small rings for race ball-bearings

The starting material consists of rolled wire, 8 mm in diameter, manufactured from a steel containing 0.76% C and 0.25% Mo, other elements in residual percentages.

The wire is used immediately after cooling, in its perlitic state.

The wire is fed through an induction coil and heated there to a temperature of about 800° C.

The wire is cut and shaped to a ring in a forging press of known design, currently in use. The forming process includes precision forming of the ring race.

The ring element is inserted directly down into a quenching bath of oil, for instance, and is thus hardened. The prescribed tempering is performed in direct conjunction.

The ring is thus ready for final grinding and polishing.

It is thus evident that the best results are achieved if the steel composition is as close as possible to eutectoid. However, the invention can be performed even if the composition deviates slightly from the optimum. "Substantially" eutectoid composition of the steel thus covers such deviations as will still allow the conventional soft-annealing mentioned earlier to be avoided, and also allow conversion to austenite in such quantities as to give sufficient hardness after quenching from a forming temperature just above A1 temperature.

I claim:

1. A method of manufacturing steel elements designed to withstand high stress, comprising forming a steel billet which has a substantially eutectoid composition by heating and shaping at a temperature just above the A1 temperature of the steel to a shape approaching the final shape of the element, followed by hardening and tempering.

2. A method of manufacturing steel elements designed to withstand high stress, consisting of forming a steel starting billet which has a substantially eutectoid composition by heating and shaping at a temperature just above the A1 temperature of the steel to a shape approaching the final shape of the element, followed by hardening and tempering.

* * * * *